(12) United States Patent
Ito (10) Patent No.: US 7,589,906 B2
(45) Date of Patent: Sep. 15, 2009

(54) ZOOM LENS SYSTEM AND AN IMAGE PICKUP APPARATUS INCLUDING THE SAME

(75) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 11/139,379

(22) Filed: May 26, 2005

(65) Prior Publication Data
US 2005/0270400 A1 Dec. 8, 2005

(30) Foreign Application Priority Data
May 28, 2004 (JP) ............. 2004-159450

(51) Int. Cl.
G02B 15/14 (2006.01)

(52) U.S. Cl. .................. 359/682; 359/689

(58) Field of Classification Search ......... 359/680–682, 359/689
See application file for complete search history.

(56) References Cited

U.S. PATENT DOCUMENTS

| | | | |
|---|---|---|---|
| 4,662,723 A | 5/1987 | Imai | |
| 4,687,302 A | 8/1987 | Ikemori | |
| 4,733,952 A | 3/1988 | Fujioka | |
| 4,936,661 A | 6/1990 | Betensky | |
| 4,955,700 A | 9/1990 | Yamaguchi | |
| 5,270,866 A * | 12/1993 | Oizumi et al. | 359/689 |
| 5,434,710 A | 7/1995 | Zozawa | |
| 5,793,534 A | 8/1998 | Gang | |
| 5,940,221 A | 8/1999 | Okayama | |
| 5,963,378 A | 10/1999 | Tochigi | |
| 6,124,984 A | 9/2000 | Shibayama | |
| 6,166,864 A | 12/2000 | Horiuchi | |
| 6,490,096 B2 | 12/2002 | Miyano | |
| 6,839,185 B2 | 1/2005 | Ohashi | |
| 6,870,688 B2 | 3/2005 | Obama | |
| 6,888,684 B2 | 5/2005 | Toyama | |
| 2005/0068637 A1 | 3/2005 | Suzuki | |
| 2005/0094285 A1 | 5/2005 | Ohashi | |

FOREIGN PATENT DOCUMENTS

| | | |
|---|---|---|
| JP | 60-31110 A | 2/1985 |
| JP | 60-150019 A | 8/1985 |
| JP | 61-221719 A | 10/1986 |
| JP | 2-63007 A | 3/1990 |
| JP | 7-77655 A | 3/1995 |
| JP | 7-270684 A | 10/1995 |
| JP | 7-318804 A | 12/1995 |
| JP | 8-179209 A | 7/1996 |
| JP | 8-292369 A | 11/1996 |
| JP | 8-320435 A | 12/1996 |
| JP | 9-113809 A | 5/1997 |
| JP | 10-104520 A | 4/1998 |
| JP | 11-23967 A | 1/1999 |
| JP | 11-211985 A | 8/1999 |
| JP | 11-305124 A | 11/1999 |

* cited by examiner

*Primary Examiner*—Scott J Sugarman
(74) *Attorney, Agent, or Firm*—Canon U.S.A., Inc. I.P. Division (57) ABSTRACT

A zoom lens system is provided that can be used as an optical system for an image pick-up device, which can have improved shading characteristics using multiple lens units, for example three lens units.

11 Claims, 11 Drawing Sheets

ZOOM LENS SYSTEM AND AN IMAGE PICKUP APPARATUS INCLUDING THE SAME

BACKGROUND OF THE INVENTION

1. Field of the Invention

The present invention relates generally to a zoom lens system and more specifically but not exclusively to a zoom lens system used in photographic optical systems.

2. Description of the Related Art

Recently, digital still cameras including those with a solid-state imaging device, such as a charged-couple device (CCD) sensor, for still image photography have been attracting attention. A photographic optical system for digital still cameras can have a significantly short overall lens length is in demand in order to reduce the size of the camera. Such an optical system requires a wide angle due to the characteristics of a still image.

A conventional zoom lens system used as a photographing optical system of a reduced-size digital still camera is a negative-leading lens system in which a lens unit can have a negative refractive power precedes the other lens units. An example of a negative-leading lens system is a zoom lens system including a lens unit can have a negative refractive power disposed closest to the object and one to three lens units can have a positive refractive power disposed on the image side of the lens unit can have a negative refractive power. Examples of such a zoom lens system are disclosed in Japanese Patent Publication Nos. 6-66008 (corresponding to U.S. Pat. No. 4,662,723) and 7-52256 (corresponding to U.S. Pat. No. 4,733,952), Japanese Patent Laid-Open Nos. 60-31110, 10-104520, and 11-23967 (corresponding to U.S. Pat. No. 6,124,984), and U.S. Pat. No. 5,434,710.

A popular conventional photographic optical system included in a digital still camera has lens units arranged such that a lens unit can have positive refractive power is disposed closest to the image to obtain telecentric optical characteristics, which reduces shading caused by the solid-state imaging device. However, due to recent advancements in technology, conventional solid-state imaging devices now can cause less shading even with a lens system can have a short eye-relief. The lens system included in such a solid-state imaging device does not have to have a positive refractive power lens unit can have disposed closest to the image and thus may contribute to producing a lens system can have a short overall length.

A negative-leading lens system in which a lens unit can have a negative refractive power is disposed closest to the image, may include three lens units can have negative, positive, and negative refractive powers, disposed in the respective order from the object side. Such a lens system is disclosed in Japanese Patent Laid-Open Nos. 2-63007 (corresponding to U.S. Pat. No. 4,955,700), 7-77655, 8-179209, 11-211985, 9-113809 (corresponding to U.S. Pat. No. 5,793,534), and 8-320435 and U.S. Pat. No. 4,936,661.

However, the zoom lens systems discussed (excluding Japanese Patent Laid-Open No. 8-320435) are for photographic optical systems for film cameras, and thus for these systems the eye-point is extremely close to the image surface. Hence, even if a solid-state imaging device has excellent shading characteristics, the angle of the off-axis rays entering the solid-state imaging devices becomes sharp and is thus unsuitable for a photographing optical system for digital still cameras. Each zoom lens system disclosed above contains a relatively large number of lenses and thus the size of the lens system cannot be reduced sufficiently enough.

The zoom lens disclosed in Japanese Patent Laid-Open No. 8-320435 is capable of forming an image on a solid-state imaging device. However, the negative refractive power of the third lens unit is small. Therefore, when a solid-state imaging device capable of can have a short eye-relief is taken into consideration, there is still leeway for reducing the overall size of the lens system.

SUMMARY OF THE INVENTION

At least one exemplary embodiment provides a small compact zoom lens system configured to be used as an optical system for a solid-state imaging device can have improved shading characteristics.

At least one exemplary embodiment provides a zoom lens system including: a first lens unit can have a negative optical power, a second lens unit can have a positive optical power, and a third lens unit can have a negative optical power. The first to third lens units are disposed in the respective order from the object side to the image side of the zoom lens system. The distances between the lens units can change during a zooming process of the zoom lens system (e.g. the distance between the first lens unit and the second lens unit, where for example the distance is measured from the image side surface of the first lens unit to the object side surface of second lens unit).

At least one exemplary embodiment provides for a zoom lens system that satisfies:

$$0.40 < Z3/Z2 < 0.82 \text{ and}$$

$$-0.7 < fW/f3 < -0.5,$$

where $$Z2 = \beta 2T/\beta 2W \text{ and}$$

$$Z3 = \beta 3T/\beta 3W,$$

and where, β2T represents the imaging magnification of the second lens unit at a telephoto end, β2W represents the imaging magnification of the second lens unit at a wide-angle end configuration, β3T represents the imaging magnification of the third lens unit at the telephoto end, β3W represents the imaging magnification of the third lens unit at the wide-angle end, fW represents the focal length of the overall zoom lens system at the wide-angle end, and f3 represents the focal length of the third lens unit.

Further areas of applicability of exemplary embodiments will become apparent from the detailed description provided hereinafter. It should be understood that the detailed description and specific examples, while indicating exemplary embodiments, are intended for purposes of illustration only and are not intended to limit the scope of exemplary embodiments.

BRIEF DESCRIPTION OF THE DRAWINGS

Exemplary embodiments will become apparent from the following detailed description, taken in conjunction with the drawings.

DESCRIPTION OF THE EMBODIMENTS

The following description of exemplary embodiment(s) is merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example lens and lens units are discussed and any material that can be used to form lenses should fall within the scope of exemplary embodiments (e.g. glass, Si). Additionally the actual size of the lens may not be discussed however any size from macro lenses to micro and nano lenses are intended to lie within the scope of exemplary embodiments (e.g. lenses with diameters of nanometer size, micro size, centimeter, and meter sizes). Additionally exemplary embodiments are not limited to visual optical photographic systems, for example the system can be designed for use with infrared and other wavelengths photographic systems.

At least a few exemplary embodiments are described below with reference to the drawings.

FIGS. 1, 3, 5, 7, and 9 are cross-sectional views of a zoom lens system according to first to fifth embodiments. FIGS. 2A-C, 4A-C, 6A-C, 8A-C, and 10A-C illustrate various aberrations (e.g., spherical aberration, astigmatisms, distortion, and lateral chromatic aberration, other equivalent aberrations and those known by one of ordinary skill) of the zoom lens system according to the first to fifth embodiments. FIGS. 2A, 4A, 6A, 8A, and 10A illustrate the conditions at a wide-angle configuration referred to as "the wide-angle end" (e.g., position (A) illustrated in FIG. 1), FIGS. 2B 4B 6B, 8B and 10B illustrate the conditions of an intermediate zoom position (e.g., position (B) illustrated in FIG. 1), and FIGS. 2C, 4C, 6C, 8C, and 10C illustrate the conditions at a telephoto configuration referred to as "the telephoto end" (e.g., position (C) illustrated in FIG. 1).

The left of each cross-sectional view (FIGS. 1, 3, 5, 7, and 9) of the lens system is the side toward the object (front side of a camera) and the right is the side toward the image (rear side of a camera). Each drawing designates several lens units with respective reference characters/numbers (e.g., L1-L4). Although the reference characters/numbers L1-L4 are used in FIGS. 1, 3, 5, 7, and 9, similar reference characters/numbers, referring to lens units, may not contain similar lens elements, for example L1 of FIG. 1, includes lens elements G101 and G102, while L1 of FIG. 3, includes lens elements G301 and G302. The lens elements of each example illustrated by FIGS. 1, 3, 5, 7, and 9 may, but need not be, similar in lens characteristics (e.g., shape, material, optical power, equivalent lens properties and lens properties as known by one of ordinary skill).

In this embodiment, a first lens unit L1 can have a negative refraction power (i.e., optical power, which is equal to an inverse of the focal length), a second lens unit L2 can have a positive refractive power, a third lens unit L3 can have a negative refractive power, and a fourth lens unit L4 can have a positive refractive power. The second lens unit L2 can comprise a first lens subunit L2a which can have a positive refractive power and a second lens subunit L2b which can have a positive refractive power. An aperture stop SP can be disposed in front of the second lens unit L2. A glass block G can be disposed to correspond to the parallel plates disposed in the light path of an optical low-pass filter, an infrared ray filter, and a cover glass.

In FIGS. 2A-C, 4A-C, 6A-C, 8A-C, and 10A-C illustrating the various aberrations, the reference characters d and g represent the d-line and g-line, respectively, where the lateral chromatic aberration is indicated by the g-line and the d-line indicates the bright line spectrum of He atom. The drawings also illustrate meridional image surfaces ΔM and sagittal image surfaces ΔS. The lateral chromatic aberration is indicated by the g-line.

During a zooming action (process), from the wide-angle end (position A) to the telephoto end (position C) of the lens units of the zoom lens system, the first lens unit L1 moves in a substantially reciprocal manner in which its trajectory is a curve convex (as viewed when the motion is plotted on an axis of time versus position) (e.g., 100 of FIG. 1, 300, 500, 700, and 900) toward the image side, and the second lens unit L2 and the third lens unit L3 move toward the object side (e.g., 110 and 120 of FIG. 1, where the slanted arrow signifying motion is the result of the motion viewed similarly to the way 100 is viewed) so that the distance between the first lens unit L1 and the second lens unit L2 decreases and the distance between the second lens unit L2 and the third lens unit L3 increases.

Figure 1:
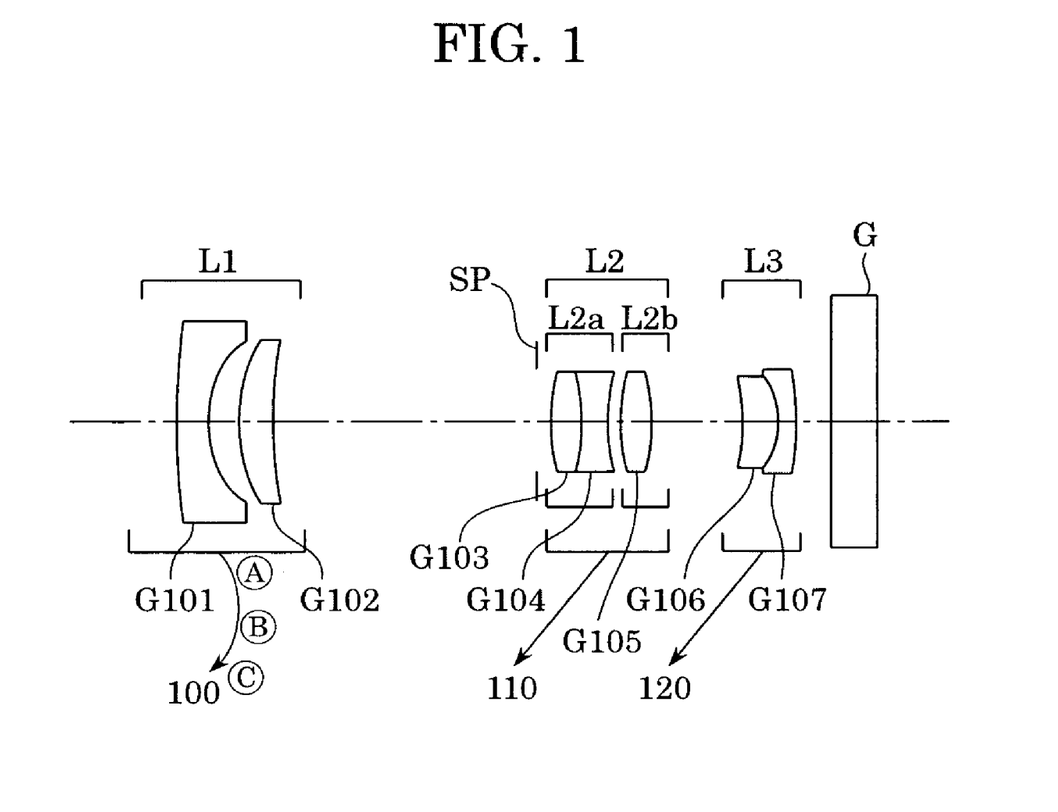
FIG. 1 illustrates a cross-sectional view of a zoom lens system according to a first embodiment.
Figure 2A:
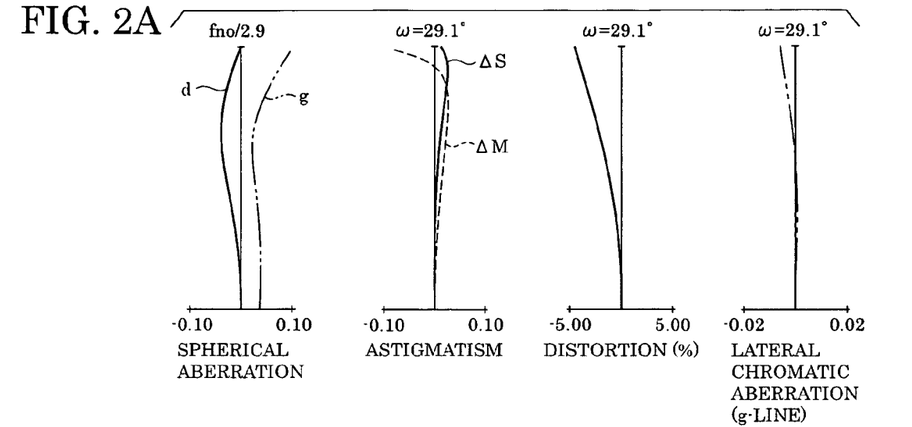
FIG. 2 illustrates the various aberrations of the zoom lens system according to the first embodiment.
Figure 2B:
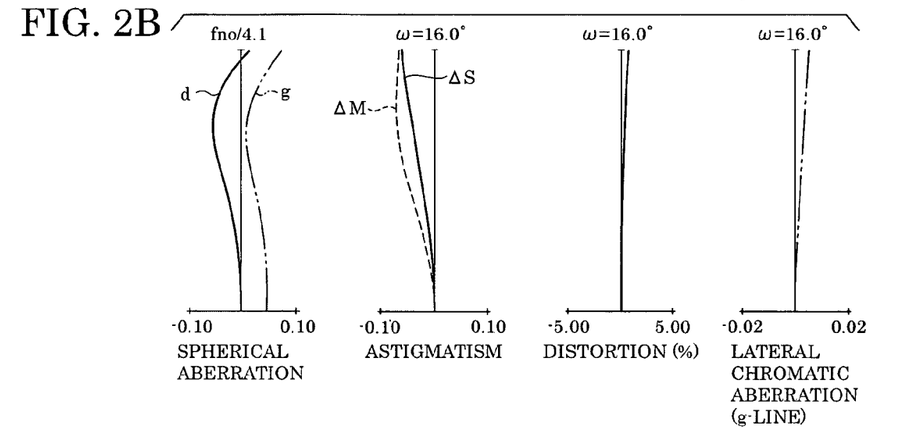
Figure 2C:
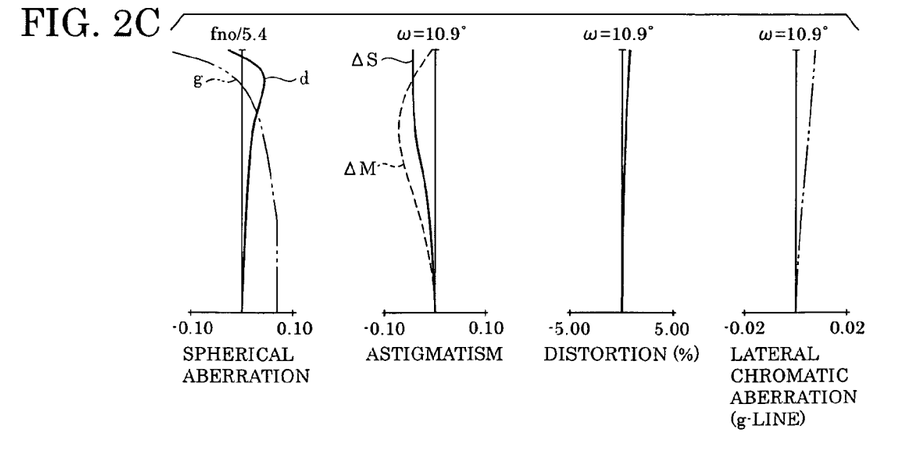
Figure 3:
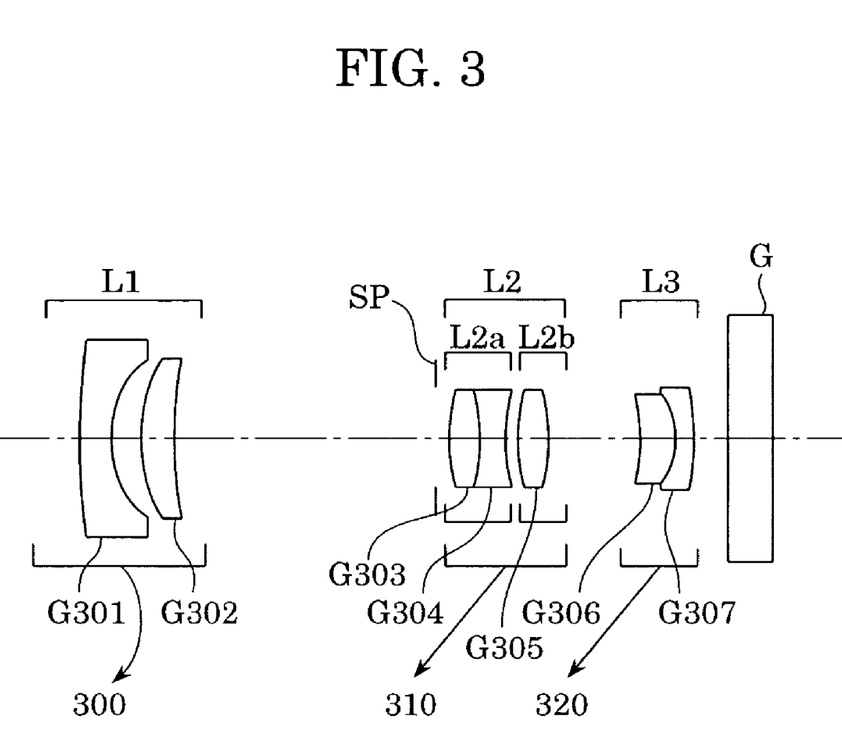
FIG. 3 illustrates a cross-sectional view of a zoom lens system according to a second embodiment.
Figure 4A:
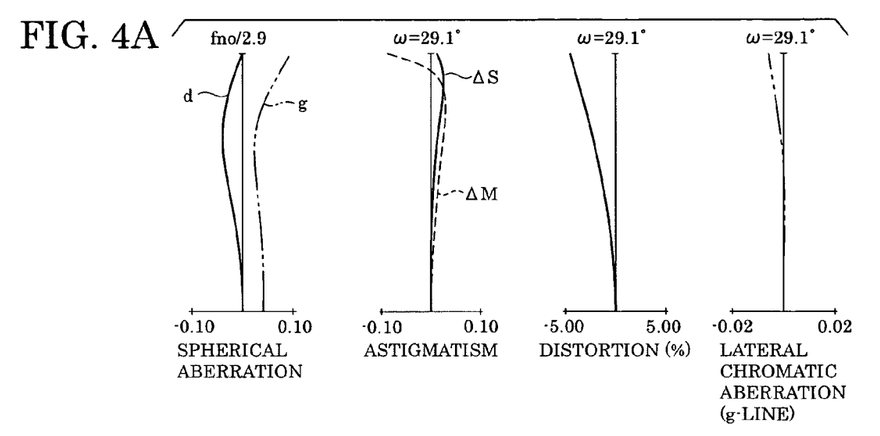
FIG. 4 illustrates the various aberrations of the zoom lens system according to the second embodiment.
Figure 4B:
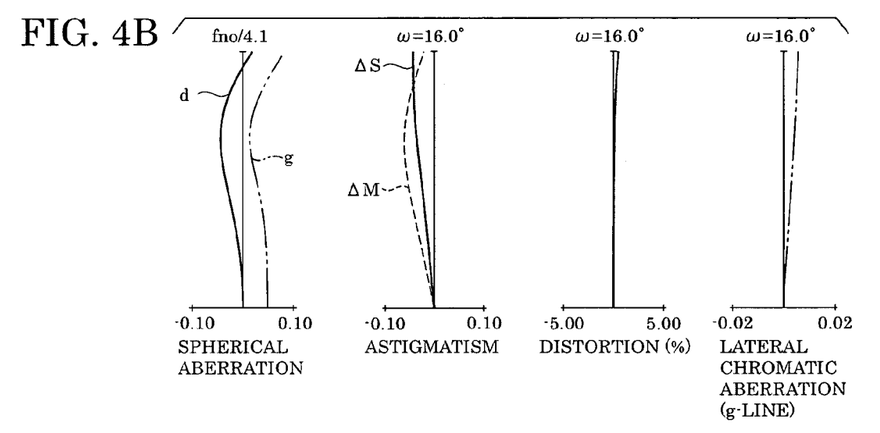
Figure 4C:
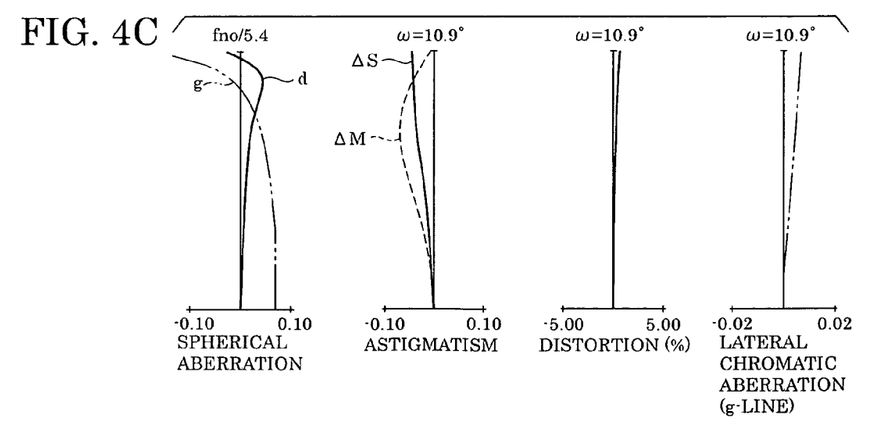
Figure 5:
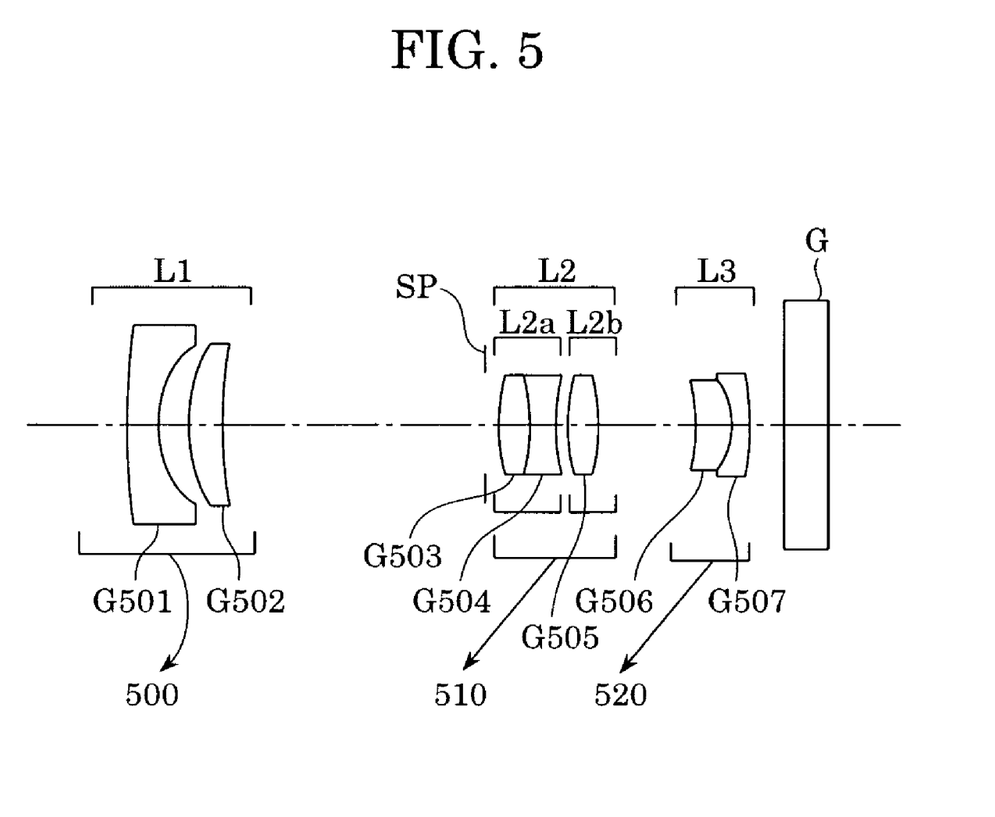
FIG. 5 illustrates a cross-sectional view of a zoom lens system according to a third embodiment.
Figure 6A:
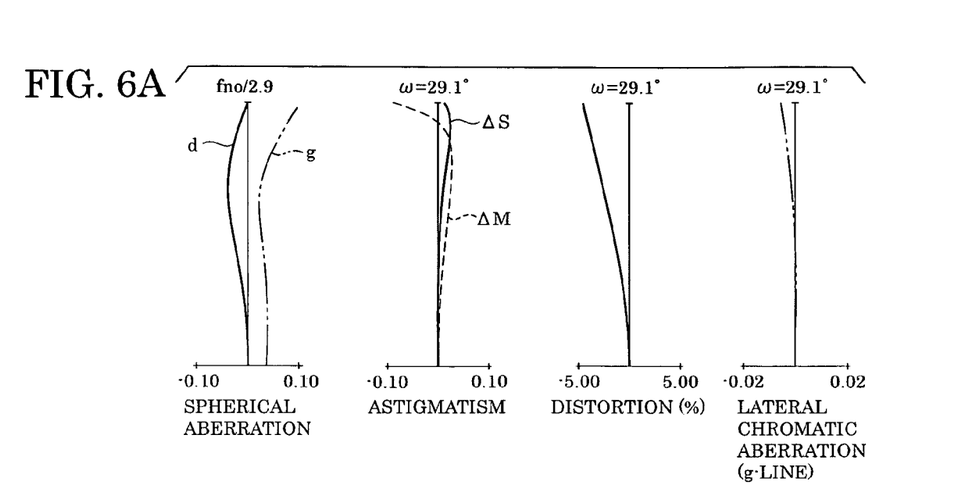
FIG. 6 illustrates the various aberrations of the zoom lens system according to the third.
Figure 6B:
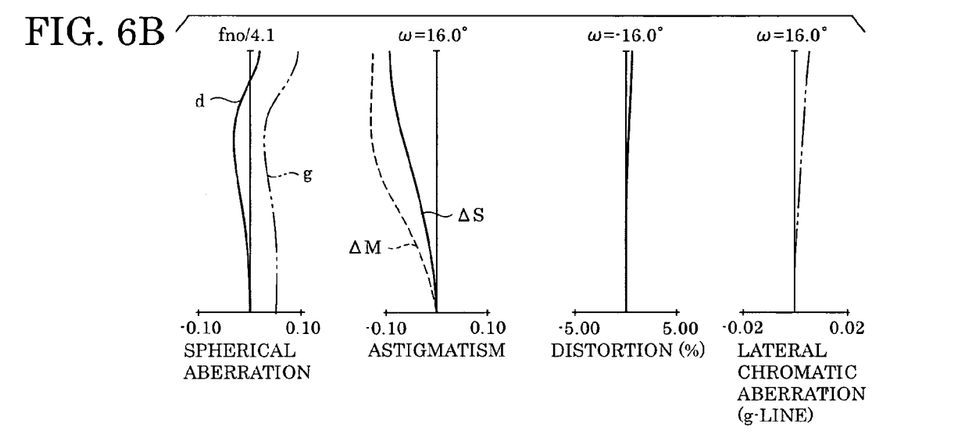
Figure 6C:
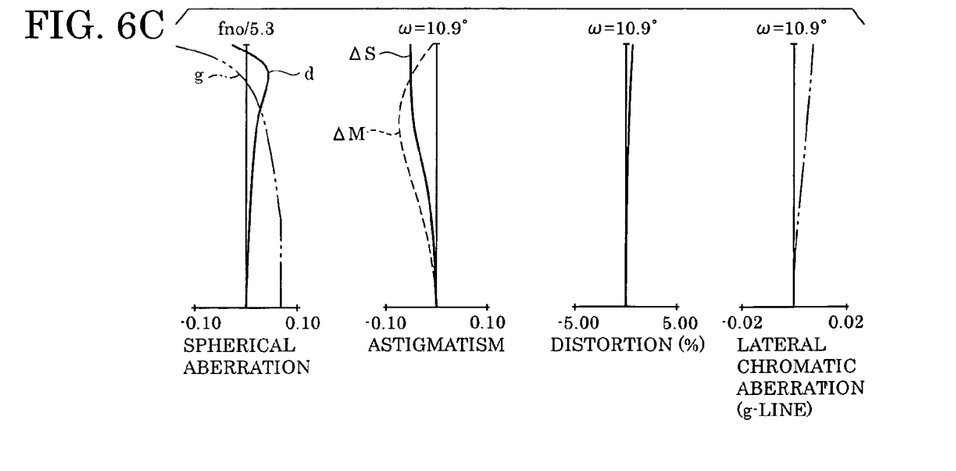
Figure 7:
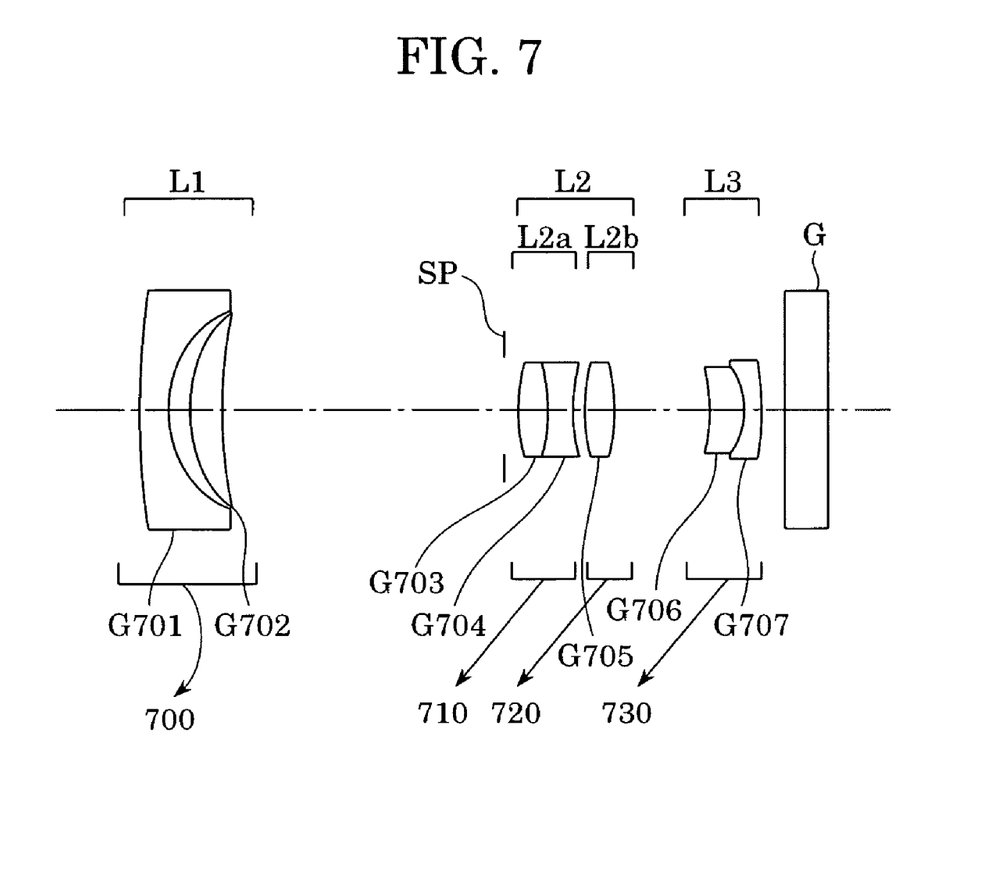
FIG. 7 illustrates a cross-sectional view of a zoom lens system according to a fourth embodiment.
Figure 8A:
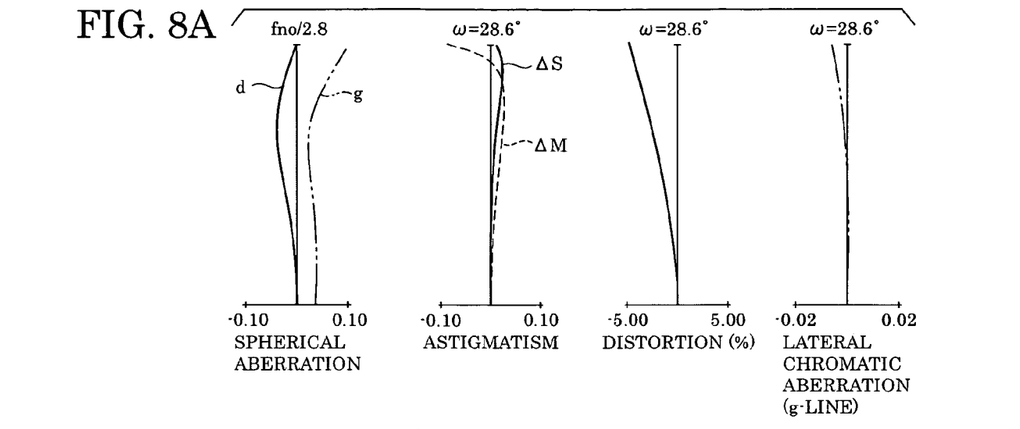
FIG. 8 illustrates the various aberrations of the zoom lens system according to the fourth embodiment.
Figure 8B:
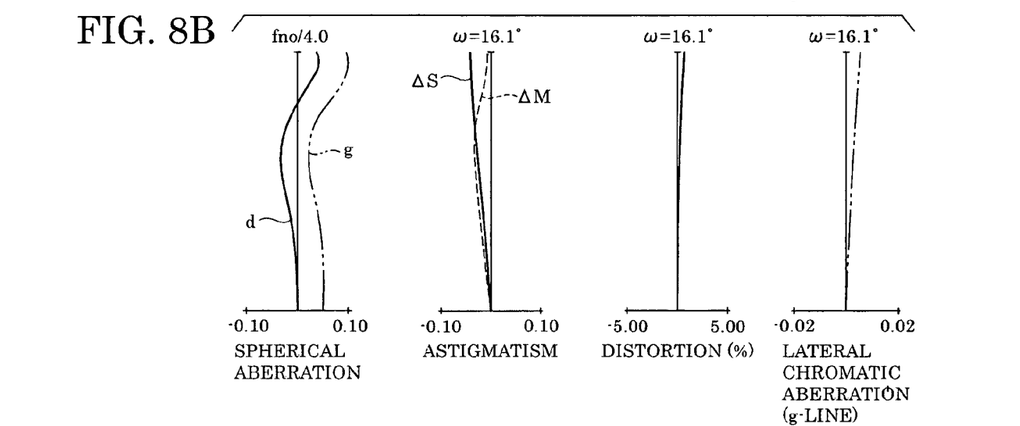
Figure 8C:
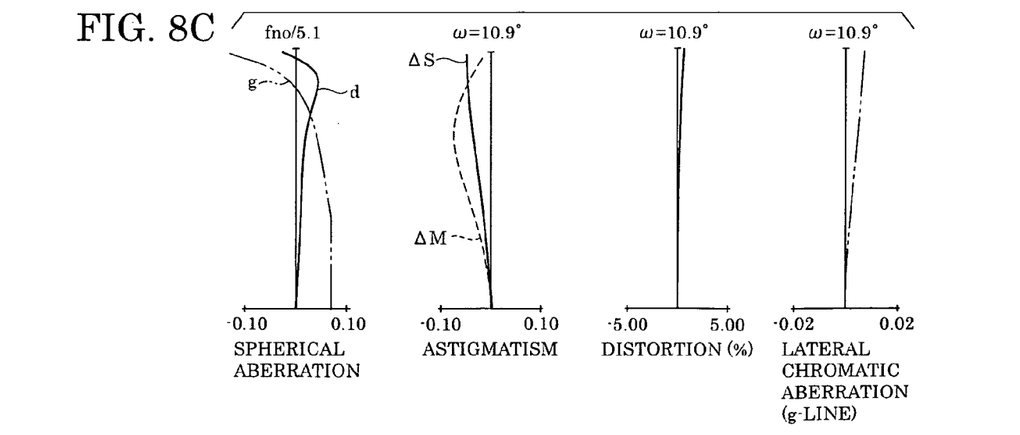
Figure 9:
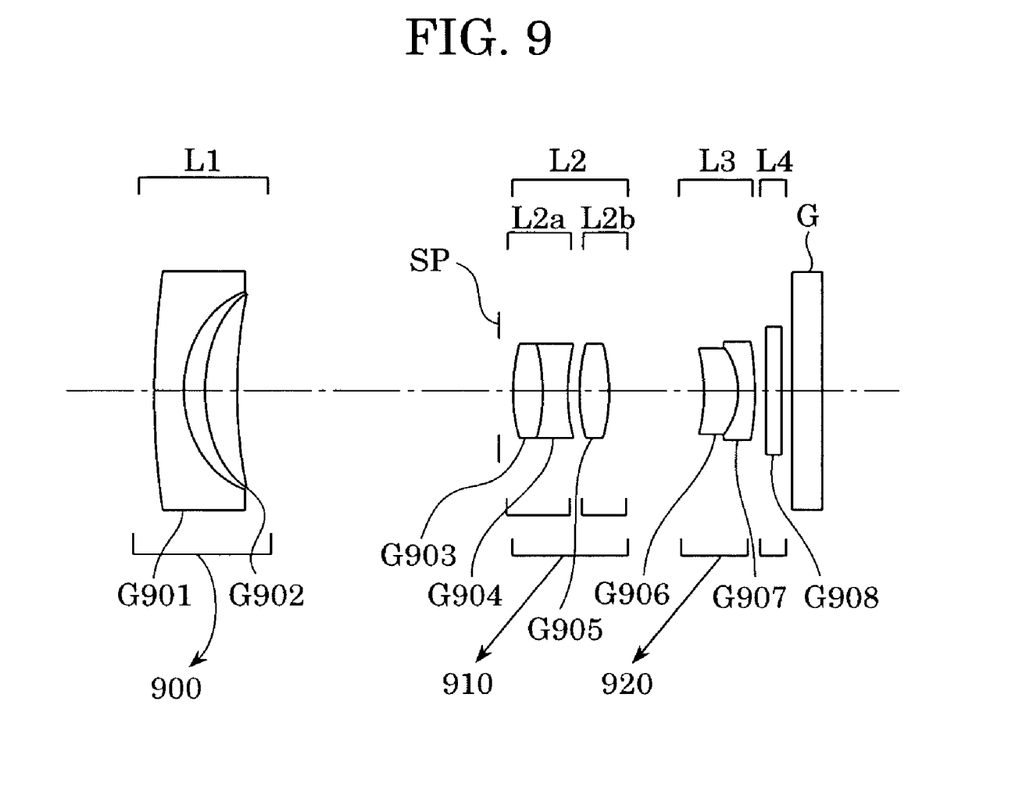
FIG. 9 illustrates a cross-sectional view of a zoom lens system according to a fifth embodiment.
Figure 10A:
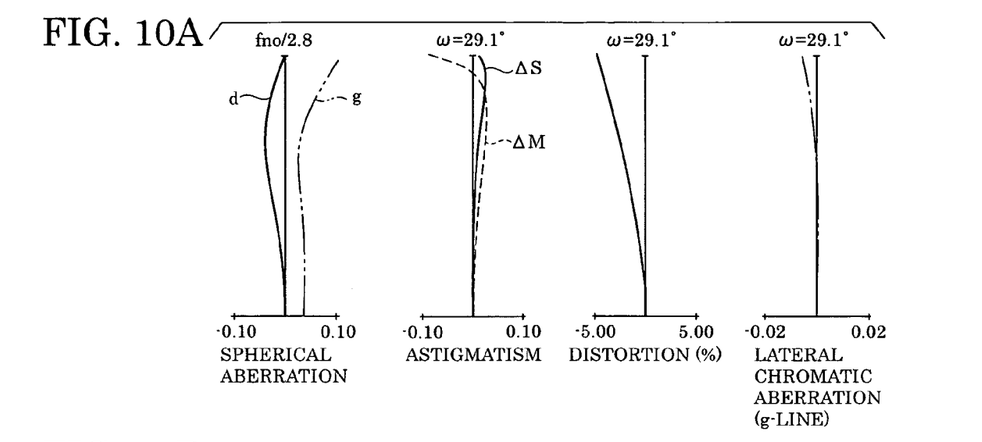
FIG. 10 illustrates the various aberrations of the zoom lens system according to the fifth embodiment.
Figure 10B:
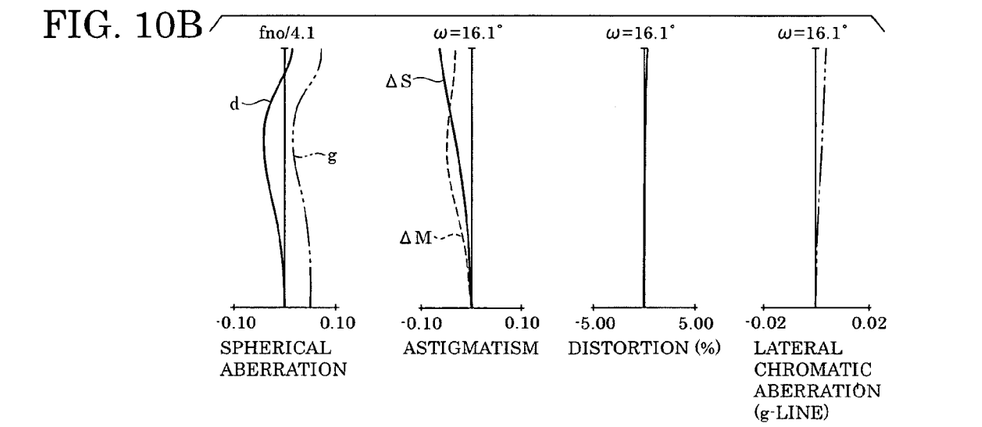
Figure 10C:
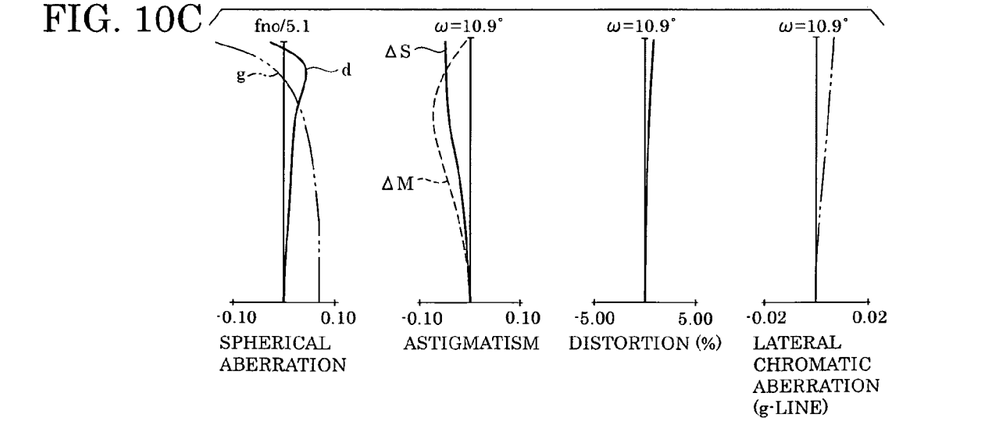

Magnification of the zoom lens system according to each embodiment is carried out by moving the second lens unit L2. In further exemplary embodiments other lens units can be moved instead or in conjunction with the second lens unit L2. The displacement of the image point caused by the magnification can be compensated for by moving the first lens unit L1 substantially reciprocally (e.g., 100) and moving the third lens unit L3 to the object side (e.g., 120).

In this embodiment, the outer diameter of the lenses included in the first lens unit L1 can be kept small by disposing the aperture stop SP next to the second lens unit L2 on the side closer to the object, and by reducing the distance between the eye-relief and the first lens unit L1 on the wide-angle end. Improved optical performance is achieved without increasing the number of lenses included in the zoom lens system by canceling out the off-axis aberration with the first lens unit L1 and the third lens unit L3, which sandwich the aperture stop SP.

In this embodiment, the first lens unit L1 includes at least one negative lens and one positive lens. The second lens unit L2 includes a positive lens, a cemented lens having a positive refractive power, which is formed by bonding a positive lens and a negative lens, and a positive lens. The lenses of the second lens unit L2 are disposed in the order from the object side to the image side. The third lens unit L3 includes two negative cemented lenses. It should be noted that although specific optical powers of lens have been described above (e.g., positive and negative) these discussion are not limitative of all exemplary embodiments. Thus, further exemplary embodiments can have various numbers of lens elements per lens unit and associated lens properties (e.g., optical power).

In the examples discussed below, of at least several exemplary embodiments, general characteristics of the lens are referred to as G1-G7. For example a referral to G1 is intended to refer in general to G101, G301, G501, G701, and G901. Thus although reference is made to G1, the reference characters/numbers G1 are not illustrated in any of the Figures and instead reference should be interpreted to refer to G101, G301, G501, G701, and G901. A further example is lens G2, which refers generally to lens G102, G302, G502, G702, and G902. Separate reference characters/numerals are used, e.g., G502 and G702, because although the general properties may be similar as discussed with respect to G2, the specific shape of lens G502 can be different than the shape of lens G702 and thus they may not be identical lens.

According to the first to fourth embodiments, the first lens unit L1 can include a negative meniscus lens G1 (e.g., G101, G301, G501, G701, and G901), which can have a concave surface facing the image side and a positive meniscus lens G2 (e.g., G102, G302, G502, G702, and G902), which can have a convex surface facing the object side. The lenses G1 and G2 are disposed in this order from the object side to the image side. The second lens unit L2 can have a positive refractive power and can include a cemented lens formed of a positive convex lens G3 (e.g., G103, G303, G503, G703, and G903) on the object side and a negative concave lens G4 (e.g., G104, G304, G504, G704, and G904) on the image side and a positive biconvex lens G5 (e.g., G105, G305, G505, G705, and G905). The lenses G3, G4, and G5 are disposed in this order from the object side to the image side. The third lens unit L3 can include a cemented lens formed of a positive meniscus lens G6 (e.g., G106, G306, G506, G706, and G906), which can have a concave surface facing the object side and a negative concave lens G7 (e.g., G107, G307, G507, G707, and G907).

The zoom lens system according to the fifth embodiment can include a fourth lens unit L4 including a positive single lens G8 (e.g. 908). Note that although the fourth lens unit L4 includes a positive lens element, additional exemplary embodiments can contain negative lens elements depending upon the configuration of the remaining lens units.

As described herein, the overall size of the zoom lens system according to each embodiment can be reduced while improved optical performance is maintained by employing a lens structure having lens units positioned such that the desired refractive power and aberration correction ability are obtained. In at least one exemplary embodiment, the overall size is not reduced but optical performance is increased. Likewise, in at least one further exemplary embodiment, the overall size is decreased but the optical performance substantially stays the same.

General characteristics that apply to each of the embodiments are described below.

The first lens unit L1 forms an image by converging the off-axis principal rays at the center of the aperture stop SP. Various off-axis aberrations, particularly, astigmatism and distortion, easily occur at the wide-angle end since the off-axis principal rays are refracted greatly. Thus, similar to a normal wide-angle lens, the first lens unit L1 according to each embodiment can include the negative lens G1 and the positive lens G2 that can reduce the diameter of the lens disposed closest to the object. In at least one exemplary embodiment, the lens surface of the negative lens G1 on the image side may have an aspherical shape where the negative refractive power is weak at the periphery of the lens. In this way, the astigmatism and distortion can substantially compensate each other. In at least one exemplary embodiment, an aspherical surface contributes to the first lens unit L1 having only two lenses and contributes to reducing the size of the overall zoom lens system.

The second lens unit L2 can include the positive convex lens G3 whose convex surface closest to the object side has a larger refractive power relative to the other surfaces in the lens unit. The second lens unit L2 can narrow the refracting angle of the off-axis principal rays that project from the first lens unit L1 and reduce the various off-axis aberrations. In at least one exemplary embodiment, the positive lens G3 is provided to correct the spherical aberration and/or coma.

According to at least one exemplary embodiment, the lens surface on the object side of the positive lens G3 is aspherical where the positive index of refraction decreases at the periphery of the lens surface, aiding in the reduction of spherical aberration and coma.

The negative lens G4 can be bonded to the image side of the positive lens G3 and can have a concave surface on the image side. The positive lens G5, disposed on the image side of the negative lens G4, can have a convex lens surface on the object side. In this way, in at least one exemplary embodiment, spherical aberration is substantially reduced. The structure of these lenses is referred to as a triplet type arrangement and is capable of substantially correcting aberration. The cemented lens formed by bonding the biconvex positive lens G3 and the biconcave negative lens G4 can contributes to shortening the overall length of the lens system when the lens barrel is retracted. Likewise, in at least one exemplary embodiment, the lens elements can substantially correct aberrations (e.g., spherical) without shortening of the overall length of the lens system.

The third lens unit L3 can be a cemented lens formed by bonding the positive meniscus lens G6, facing a concave surface to the object side, and the negative meniscus lens G7, facing a concave surface to the object side. Accordingly, the third lens unit L3 does not refract, significantly, the light rays and can contribute to correcting the various aberrations in at least some zoom positions. In particular, by using a cemented lens for the third lens unit L3, longitudinal chromatic aberration and lateral chromatic aberration are reduced. The cemented lens of the third lens unit L3 can contribute to shortening the overall length of the lens system when the lens barrel is retracted.

Focusing can be carried out by moving the third lens unit L3. In at least one exemplary embodiment, the third lens unit L3 is light and small, thus fast focusing is possible and the third lens unit L3 can have a lens structure reducing the variation in aberration, and/or reducing the aberration. According to at least one exemplary embodiment, the second lens unit L2 is referred to as one lens unit. However, since the distance between the first lens subunit L2a and the second lens subunit L2b of the second lens unit L2, according to the fourth embodiment, changes during zooming (e.g. where the distance is measured from the image side surface of the first lens subunit L2a to the object side surface of second lens subunit L2b), such a lens unit L2 may be interpreted as including four lens units having a refractive power of negative, positive, positive, and negative, in order from the object side.

In at least one exemplary embodiment: the imaging magnification of the second lens unit L2 at the telephoto end is referred to as β2T; the imaging magnification of the second lens unit L2 at the wide-angle end as β2W; the imaging magnification of the third lens unit L3 at the telephoto end as β3T; the imaging magnification of the third lens unit L3 at the wide-angle end as β3W; focal length of the overall lens system at the wide-angle end as fW; the focal length of the second lens unit L2 at the wide angle end as f2; the focal length of the third lens unit L3 as f3; the radius of curvature of the surface of the third lens unit L3 closest to the object as R1a; and the radius of curvature of the surface of the third lens unit L3 closest to the image as R2b. In at least one exemplary embodiment the following conditions are satisfied:

$$0.40 < Z3/Z2 < 0.82 \quad (1)$$

$$-0.7 < fW/f3 < -0.5 \quad (2)$$

$$-0.9 < f2/f3 < -0.6 \quad (3)$$

$$-4 < (R1a+R2b)/(R1a-R2b) < 0 \quad (4)$$

where $$Z2 = \beta 2T/\beta 2W \text{ and}$$

$$Z3 = \beta 3T/\beta 3W, \text{ and}$$

where $$\beta 2W = \beta 2aW \cdot \beta 2bW \text{ and}$$

$$\beta 2T = \beta 2aT \cdot \beta 2bT$$

where in this example (e.g. as in the fourth embodiment) the distance between the first lens subunit L2a and the second lens subunit L2b of second lens unit L2 changes during zooming. The value of the term "imaging magnification" for each lens unit is the value of the magnification of the lens unit when the lens system is focused on an object at an infinite distance.

Formula (1) relates to the imaging magnifications of the second lens unit L2 and the third lens unit L3 and can be used for effectively obtaining a predetermined zoom ratio that reduces the variation in aberration during zooming. If the zooming ratio of the imaging magnifications of the second lens unit L2 and the third lens unit L3 exceeds the upper limit represented by the formula, the moving distance of the third lens unit L3 can increase. Consequently, it can be difficult to reduce the size of the lens system.

If the zooming ratio of the imaging magnifications of the second lens unit L2 and the third lens unit L3 fall below the lower limit represented by the formula, the moving distance of the third lens unit L3 can decrease. Consequently, the refractive power of the second lens unit L2 can be increased in order to obtain the predetermined zooming ratio and, therefore, large aberrations occur and correcting the aberrations becomes difficult.

In other exemplary embodiments, the upper and lower limits can have various values and the values stated here (upper and lower) are for illustrative purposes of particular examples only and the discussions herein related to the consequences of exceeding or lying below upper or lower limits, should not be interpreted to be limitative of other exemplary embodiments.

In yet at another exemplary embodiment, the ranges in Formula (1) can be set as below:

$$0.60 < Z3/Z2 < 0.78 \quad (1a)$$

Formula (2) stipulates the focal length of the third lens unit L3 in the particular example discussed herein. If the refractive power of the third lens unit L3 exceeds the upper limit indicated by the formula, it can become difficult to correct the various aberrations that occur in the third lens unit L3. If the refractive power of the third lens unit L3 falls below the lower limit indicated by the formula, the moving distance of the third lens unit L3 can increase and it can become difficult to reduce the size of the lens system.

In yet at another exemplary embodiment, the ranges in Formula (2) can be set as below:

$$-0.67 < fW/f3 < -0.53 \quad (2a)$$

Formula (3) stipulates the ratio of the focal distances of the third lens unit L3 and the second lens unit L2, in the particular example discussed herein. When the ratio of the focal distances fall below the lower limit indicated by the formula, the relative refractive power of the second lens unit L2 becomes greater and thus the various aberrations that occur at the second lens unit L2 can increase. To correct the various aberrations, the number of lenses constituting the third lens unit L3 can be increased. Also, it can become difficult to shorten the overall length of the lens system including the back-focus of the wide-angle end and, thus it can become difficult to reduce the overall size of lens system. When the ratio of the focal distances exceeds the upper limit indicated by the formula, the relative refractive power of the second lens unit L2 decreases. Consequently, the second lens unit L2 can be moved an increased distance to obtain a predetermined zooming ratio, and thus in this example it can become difficult to reduce the size of the overall lens system.

In yet at another exemplary embodiment, the ranges in Formula (3) can be set as below:

$$-0.80 < f2/f3 < -0.62 \quad (3a)$$

Formula (4) stipulates the lens shape of the third lens unit L3, in the particular example discussed herein. When the curvature R1 and R2 decreases (when the radii of curvature become large) below the lower limit, it becomes difficult to correct the astigmatism that occurs at the first lens unit L1. Moreover, since the refractive power of the third lens unit L3 decreases, the moving distance of the second lens unit L2 can increase to obtain the predetermined zooming ratio and thus it becomes difficult to reduce the size of the overall lens system. When the curvature R1 and R2 increases (when the radii of curvature become small) above the upper limit, the refractive power of the third lens unit L3 increases and consequently the various aberrations increase. Accordingly, it can become difficult to correct the various aberrations.

In yet at another exemplary embodiment, the ranges in Formula (4) can be set as below:

$$-3.3 < (R1a+R2b)/(R1a-R2b) < -1.0 \quad (4a)$$

The numerical data corresponding to the lens systems according the first to fifth embodiments are shown as numerical examples below. In the numerical examples, f represents the focal length, Fno represents the F number, ω represents the half field angle, i represents the number of the lens surface counted from the object side, Ri represents the radius of curvature of the ith surface, Di represents the axial distance between the ith surface and the (i+1)th surface, Ni represents the index of refraction based on the d-line of the material the ith surface is composed of, and vi represent the Abbe number based on the d-line of the material the ith surface is composed of.

An aspherical surface is represented as $$x = \frac{(1/R)h^2}{1 + \sqrt{\{1 - (1+K)(h/R)^2\}}} + Bh^4 + Ch^6 + Dh^8 + Eh^{10}$$

where light travels in a positive direction, X represent the displacement from the surface apex in the optical axis direction, h represent the height from the optical axis of a point perpendicular to the optical axis, R represents the paraxial radius of curvature, K represents the conic constant, and B to E are aspherical coefficients. In the following, "e±Z" is equivalent to "×10$^{\pm Z}$."

The relationship between the formulas indicated above and the numerical examples are shown in Table 1.

(First numeral example)
f = 7.90 to 22.80    Fno = 2.88 to 5.40    2ω = 58.2° to 21.8°

| | | | |
|---|---|---|---|
| R1 = 43.162 | D1 = 1.60 | N1 = 1.882997 | ν1 = 40.8 |
| R2 = 5.884 | D2 = 1.77 | | |
| R3 = 9.236 | D3 = 2.00 | N2 = 1.846659 | ν2 = 23.8 |
| R4 = 22.079 | D4 = variable | | |
| R5 = aperture stop | D5 = 0.80 | | |
| R6 = 10.245 | D6 = 1.85 | N3 = 1.730770 | ν3 = 40.5 |
| R7 = −14.052 | D7 = 1.49 | N4 = 1.805181 | ν4 = 25.4 |
| R8 = 16.243 | D8 = 0.65 | | |
| R9 = 9.399 | D9 = 2.19 | N5 = 1.487490 | ν5 = 70.2 |
| R10 = −8.783 | D10 = variable | | |
| R11 = −8.609 | D11 = 2.00 | N6 = 1.683780 | ν6 = 31.1 |
| R12 = −4.707 | D12 = 0.90 | N7 = 1.834807 | ν7 = 42.7 |
| R13 = −28.336 | D13 = variable | | |
| R14 = ∞ | D14 = 2.50 | N8 = 1.516330 | ν8 = 64.1 |
| R15 = ∞ | | | |

-continued

| | Focal length | | |
|---|---|---|---|
| Variable distance | 7.90 | 19.54 | 22.80 |
| D4 | 15.67 | 2.84 | 1.62 |
| D10 | 5.29 | 5.41 | 5.42 |
| D13 | 2.32 | 9.85 | 12.01 |

Aspherical coefficient

Second surface

K = −2.105511e+00    B = 1.02674e−03    C = −8.05830e−06    D = 1.81985e−07
E = −1.88503e−09

Sixth surface

K = −2.4577e+00    B = −6.96190e−05    C = −6.50190e−06    D = −3.97618e−07
E = 4.13964e−09

Eleventh surface

K = 0.00000e+00    B = −7.30352e−04    C = −9.64426e−05    D = 1.19573e−05
E = −8.58288e−07

(Second numeral example)
f = 7.90 to 22.80    Fno = 2.88 to 5.35    2ω = 58.2° to 21.8°

| | | | |
|---|---|---|---|
| R1 = 94.602 | D1 = 1.60 | N1 = 1.882997 | ν1 = 40.8 |
| R2 = 5.999 | D2 = 1.45 | | |
| R3 = 9.486 | D3 = 2.00 | N2 = 1.805181 | ν2 = 25.4 |
| R4 = 37.373 | D4 = variable | | |
| R5 = aperture stop | D5 = 0.80 | | |
| R6 = 10.658 | D6 = 1.82 | N3 = 1.802380 | ν3 = 40.6 |
| R7 = −28.466 | D7 = 1.51 | N4 = 1.846660 | ν4 = 23.9 |
| R8 = 13.869 | D8 = 0.69 | | |
| R9 = 8.936 | D9 = 2.35 | N5 = 1.487490 | ν5 = 70.2 |
| R10 = −8.791 | D10 = variable | | |
| R11 = −6.441 | D11 = 2.00 | N6 = 1.683780 | ν6 = 31.1 |
| R12 = −4.141 | D12 = 0.90 | N7 = 1.882997 | ν7 = 40.8 |
| R13 = −13.262 | D13 = variable | | |
| R14 = ∞ | D14 = 2.50 | N8 = 1.516330 | ν8 = 64.1 |
| R15 = ∞ | | | |

| | Focal length | | |
|---|---|---|---|
| Variable distance | 7.90 | 19.51 | 22.80 |
| D4 | 16.01 | 2.72 | 1.42 |
| D10 | 5.77 | 5.96 | 6.00 |
| D13 | 1.64 | 8.88 | 10.94 |

Aspherical coefficient

Second surface

K = −2.68398e+00    B = 1.26038e−03    C = −2.08003e−05    D = 4.46814e−07
E = −4.86921e−09

Sixth surface

K = −2.42518e+00    B = −1.05442e−04    C = −4.69148e−06    D = −4.69208e−07
E = 9.88667e−09

Eleventh surface

K = 0.00000e+00    B = −3.66437e−04    C = −1.18989e−04    D = 1.57970e−05
E = −1.05192e−06

| (Third numerical example) | | | |
|---|---|---|---|
| f = 7.90 to 22.80 | Fno 2.88 to 5.29 | | 2ω == 58.2° to 21.8° |
| R1 = 63.389 | D1 = 1.60 | N1 = 1.882997 | ν1 = 40.8 |
| R2 = 6.039 | D2 = 1.44 | | |
| R3 = 9.501 | D3 = 2.00 | N2 = 1.846660 | ν2 = 23.8 |
| R4 = 26.526 | D4 = variable | | |
| R5 = aperture stop | D5 = 0.80 | | |
| R6 = 10.550 | D6 = 1.82 | N3 = 1.802380 | ν3 = 40.6 |
| R7 = 133.792 | D7 = 1.51 | N4 = 1.922860 | ν4 = 18.9 |
| R8 = 14.577 | D8 = 0.48 | | |
| R9 = 8.396 | D9 = 2.35 | N5 = 1.487490 | ν5 = 70.2 |
| R10 = −9.786 | D10 = variable | | |
| R11 = −6.069 | D11 = 2.00 | N6 = 1.683780 | ν6 = 31.1 |
| R12 = −3.987 | D12 = 0.90 | N7 = 1.834807 | ν7 = 42.7 |
| R13 = −11.791 | D13 = variable | | |
| R14 = ∞ | D14 = 2.50 | N8 = 1.516330 | ν8 = 64.1 |
| R15 = ∞ | | | |

| | Focal length | | |
|---|---|---|---|
| Variable distance | 7.90 | 19.49 | 22.80 |
| D4 | 16.03 | 2.85 | 1.54 |
| D10 | 5.74 | 6.11 | 6.18 |
| D13 | 1.87 | 9.02 | 11.08 |

Aspherical coefficient

Second surface

K = −2.63008e+00   B = 1.21282e−03   C = −1.64397e−05   D = 3.12136e−07
E = −2.90239e−09

Sixth surface

K = −1.91705e+00   B = −1.12797e−04   C = −2.09017e−06   D = −4.86205e−07
E = 1.33694e−08

Eleventh surface

K = 0.00000e+00   B = −3.67767e−04   C = −1.46352e−04   D = 2.15093e−05
E = −1.46210e−06

| (Fourth numerical example) | | | |
|---|---|---|---|
| f = 8.04 to 22.80 | Fno = 2.88 to 5.09 | | 2ω = 57.2° to 21.2° |
| R1 = 58.708 | D1 = 1.60 | N1 = 1.882997 | ν1 = 40.8 |
| R2 = 6.061 | D2 = 1.45 | | |
| R3 = 9.198 | D3 = 2.00 | N2 = 1.805181 | ν2 = 25.4 |
| R4 = 30.260 | D4 = variable | | |
| R5 = aperture stop | D5 = 0.80 | | |
| R6 = 10.872 | D6 = 1.82 | N3 = 1.802380 | ν3 = 40.6 |
| R7 = −36.014 | D7 = 1.51 | N4 = 1.846660 | ν4 = 23.9 |
| R8 = 13.203 | D8 = variable | | |
| R9 = 8.162 | D9 = 2.35 | N5 = 1.487490 | ν5 = 70.2 |
| R10 = −9.376 | D10 = variable | | |
| R11 = −6.601 | D11 = 2.00 | N6 = 1.683780 | ν6 = 31.1 |
| R12 = −3.983 | D12 = 0.90 | N7 = 1.882997 | ν7 = 40.8 |
| R13 = −13.094 | D13 = variable | | |
| R14 = ∞ | D14 = 2.50 | N8 = 1.516330 | ν8 = 64.1 |
| R15 = ∞ | | | |

| | Focal length | | |
|---|---|---|---|
| Variable distance | 8.04 | 19.40 | 22.80 |
| D4 | 17.44 | 3.04 | 1.49 |
| D8 | 0.62 | 0.36 | 0.29 |
| D10 | 5.68 | 6.10 | 6.23 |
| D13 | 1.85 | 8.10 | 9.84 |

-continued (Fourth numerical example)

Aspherical coefficient

Second surface

K = −2.54963e+00   B = 1.21177e−03   C = −1.95420e−05   D = 4.86533e−07
E = −5.63819e−09

Sixth surface

K = −2.32550e+00   B = −9.91472e−05   C = −4.78380e−06   D = −4.19265e−07
E = 1.01218e−08

(Fifth numerical example)

| f = 7.90 to 22.80 | Fno2.88 to 5.36 | 2ω = 58.2° to 21.8° | |
|---|---|---|---|
| R1 = 87.929 | D1 = 1.60 | N1 = 1.882997 | ν1 = 40.8 |
| R2 = 6.087 | D2 = 1.44 | | |
| R3 = 9.451 | D3 = 2.00 | N2 = 1.805181 | ν2 = 25.4 |
| R4 = 36.058 | D4 = variable | | |
| R5 = aperture stop | D5 = 0.80 | | |
| R6 = 11.016 | D6 = 1.82 | N3 = 1.802380 | ν3 = 40.6 |
| R7 = −27.412 | D7 = 1.51 | N4 = 1.846660 | ν4 = 23.9 |
| R8 = 14.369 | D8 = 0.71 | | |
| R9 = 8.875 | D9 = 2.35 | N5 = 1.487490 | ν5 = 70.2 |
| R10 = −8.925 | D10 = variable | | |
| R11 = −6.384 | D11 = 2.00 | N6 = 1.683780 | ν6 = 31.1 |
| R12 = −4.063 | D12 = 0.90 | N7 = 1.882997 | ν7 = 40.8 |
| R13 = −13.262 | D13 = variable | | |
| R14 = 164.676 | D14 = 1.00 | N8 = 1.544270 | ν8 = 70.6 |
| R15 = −221.430 | D15 = 0.50 | | |
| R16 = ∞ | D16 = 2.10 | N9 = 1.516330 | ν9 = 64.1 |
| R17 = ∞ | | | |

| | Focal length | | |
|---|---|---|---|
| Variable distance | 7.90 | 19.51 | 22.80 |
| D4 | 16.28 | 2.77 | 1.45 |
| D10 | 5.85 | 6.00 | 6.03 |
| D13 | 0.91 | 8.23 | 10.31 |

Aspherical Coefficient

Second surface

K = −2.79410e+00   B = 1.27480e−03   C = −2.16773e−05   D = 4.67321e−07
E = −4.93431e−09

Sixth surface

K = −2.02521e+00   B = −1.55242e−04   C = −4.67749e−06   D = −4.59994e−07
E = 1.07536e−08

Eleventh surface

K = 0.00000e+00   B = −3.79452e−04   C = −9.23099e−05   D = 1.12599e−05
E = −7.53575e−07

TABLE 1

| | Numeral Example 1 | Numeral Example 2 | Numeral Example 3 | Numeral Example 4 | Numeral Example 5 |
|---|---|---|---|---|---|
| Formula 1 | 0.770 | 0.749 | 0.691 | 0.687 | 0.763 |
| Formula 2 | −0.637 | −0.634 | −0.553 | −0.635 | −0.649 |
| Formula 3 | −0.737 | −0.739 | −0.644 | −0.861 | −0.761 |
| Formula 4 | −1.873 | −2.889 | −3.121 | −3.033 | −2.857 |

An optical apparatus including the zoom lens according to one of the first to fifth embodiments as a photographing optical system will be described with reference to FIG. 11.

Figure 11:
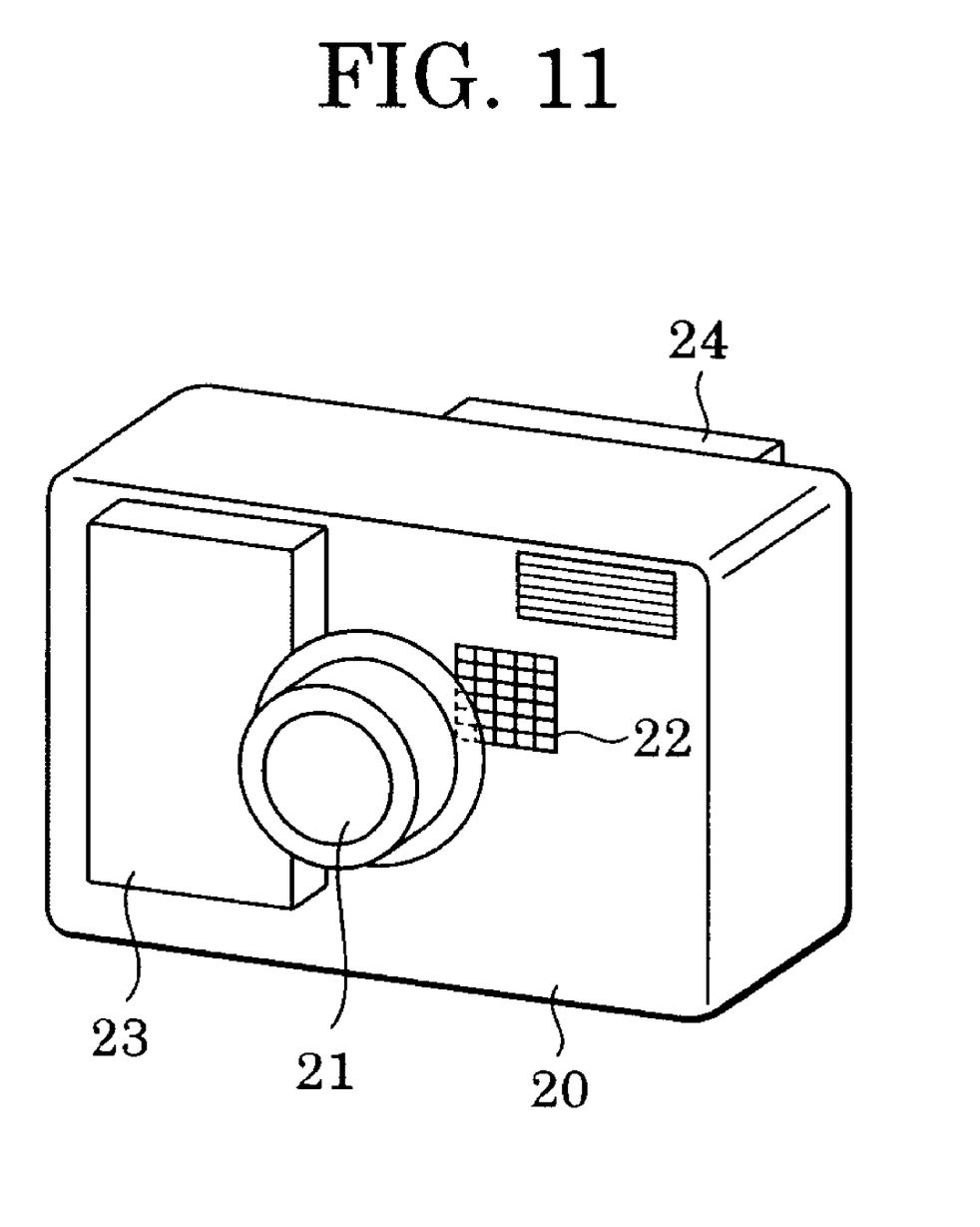
FIG. 11 illustrates an overview of the main parts of a digital still camera.

FIG. 11 illustrates an image pick-up apparatus (e.g. a digital camera, a video camera, video projector, television camera, other devices that use zooming lens units) including the zoom lens system according to at least one exemplary embodiment. The optical device in FIG. 11 includes: a camera body 20; a photographic optical system 21 comprising the zoom lens system (e.g., as according to the first to fifth embodiments); an imaging device (e.g., a solid state imaging device such as a photoelectric transducer) 22, such as a CCD sensor or a metal-oxide semiconductor (MOS) sensor, for receiving the image of an object formed by the photographic optical system 21, a memory 23 for recording data corresponding to the image of an object photoelectrically converted by the imaging device 22, and a view finder 24 (e.g., formed of a liquid crystal display panel) to view the image of an object formed on the solid-state imaging device 22.

As described above, by applying the zoom lens system according to at least one exemplary embodiment to an image pickup apparatus (e.g., such as a video camera or a digital still camera), the size of the image pickup apparatus can be reduced while maintaining increased optical performance.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims and discussion herein. The scope of the following claims is to be accorded the broadest interpretation so as to encompass all such modifications and equivalent structures and functions.

This application claims priority from Japanese Patent Application No. 2004-159450 filed May 28, 2004, which is hereby incorporated herein in its entirety.

What is claimed is:

1. A zoom lens system comprising:
a first lens unit having a negative optical power;
a second lens unit having a positive optical power; and
a third lens unit having a negative optical power, wherein
the first, second, and third lens units being disposed in order from the object side to the image side of the zoom lens system,
wherein a distance between the first and second lens units and a distance between the second and third lens units changes during a zooming process of the zoom lens system, and
wherein $$0.40 < Z3/Z2 < 0.82$$

and $$-0.7 < fW/f3 < -0.5$$

are satisfied, where $$Z2 = \beta 2T/\beta 2W$$

$$Z3 = \beta 3T/\beta 3W$$

$\beta 2T$ represents the imaging magnification of the second lens unit at the telephoto end, $\beta 2W$ represents the imaging magnification of the second lens unit at the wide-angle end, $\beta 3T$ represent the imaging magnification of the third lens unit at the telephoto end, $\beta 3W$ represents the imaging magnification of the third lens unit at the wide-angle end, fW represents the focal length of the overall zoom lens system at the wide-angle end, and f3 represents the focal length of the third lens unit wherein the second lens unit comprises a first lens subunit having a positive optical power and a second lens subunit having a positive optical power, and wherein a distance between the first lens subunit and the second lens subunit changes during zooming.

2. The zoom lens system according to claim 1, wherein the first lens subunit comprises a cemented lens including a positive lens and a negative lens.

3. The zoom lens system according to claim 1, wherein the second lens subunit comprises a single lens.

4. The zoom lens system according to claim 1, wherein $$-0.9 < f2/f3 < -0.6$$

is satisfied, where f2 represents the focal length of the second lens unit.

5. The zoom lens system according to claim 1, wherein $$-4 < (R1a + R2b)/(R1a - R2b) < 0$$

is satisfied, where R1a represents the radius of curvature of the surface of the third lens unit closest to the object and R2b represents the radius of curvature of the surface of the third lens unit closest to the image.

6. The zoom lens system according to claim 1, wherein the first lens unit comprises a negative aspherical lens and a positive lens.

7. The zoom lens system according to claim 1, wherein the third lens unit comprises a cemented lens.

8. The zoom lens system according to claim 1, wherein the zoom lens system is capable of forming an image on a photoelectric transducer.

9. An image pickup apparatus comprising
the zoom lens system according to claim 1; and
a photoelectric transducer receiving an image formed by the zoom lens system.

10. The zoom lens system according to claim 1, wherein the first, second and third lens units are moved during the zooming process of the zoom lens system.

11. The zoom lens system according to claim 1, further comprising:
a fourth lens unit L4 having a positive optical power.

* * * * *